B. G. WENKER & J. F. KRAUSE.
FOOT ACTION FLUSHER OR WATER SUPPLY DEVICE.
APPLICATION FILED FEB. 27, 1913.
1,083,382.
Patented Jan. 6, 1914.
2 SHEETS—SHEET 1.
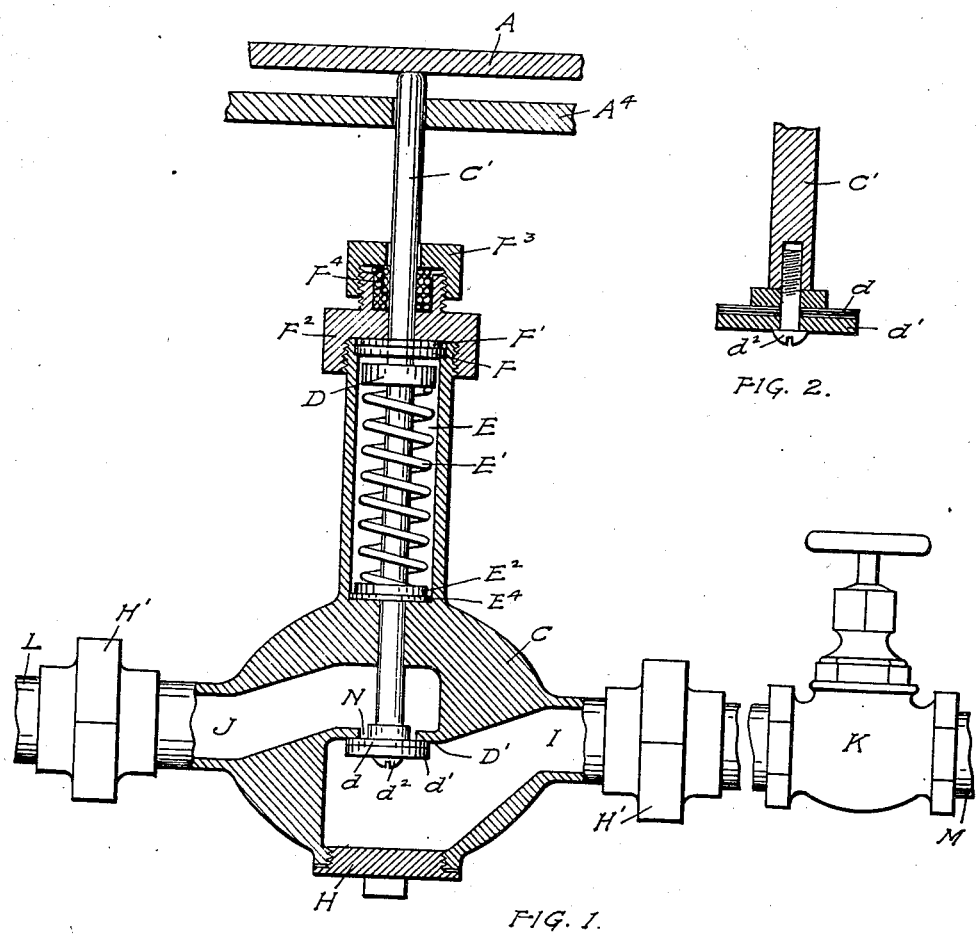

B. G. WENKER & J. F. KRAUSE.
FOOT ACTION FLUSHER OR WATER SUPPLY DEVICE.
APPLICATION FILED FEB. 27, 1913.

1,083,382.

Patented Jan. 6, 1914.

2 SHEETS—SHEET 2.

WITNESSES:
A. B. Cornelius
C. D. Fox

INVENTORS:
Benedict G. Wenker
BY John F. Krause
Eugene Ayres,
ATTORNEY.

UNITED STATES PATENT OFFICE.

BENEDICT G. WENKER AND JOHN F. KRAUSE, OF ST. JOSEPH, MISSOURI.

FOOT-ACTION FLUSHER OR WATER-SUPPLY DEVICE.

1,083,382. Specification of Letters Patent. Patented Jan. 6, 1914.

Application filed February 27, 1913. Serial No. 751,013.

*To all whom it may concern:*

Be it known that we, BENEDICT G. WENKER and JOHN F. KRAUSE, citizens of the United States of America, residing at St. Joseph, in the county of Buchanan and State of Missouri, have invented certain new and useful Improvements in Foot-Action Flushers or Water-Supply Devices, of which the following is a specification.

In public buildings and at watering troughs where cattle and other animals are watered there is probably more water wasted by reason of not being turned off and running freely when not used than that which is used.

The object of our invention is to provide a device through which water may be turned on at lavatories, urinals, sinks, drinking fountains, troughs for watering animals and at any other places where required either for drinking or flushing purposes by the simple weight of the person or animal stepping upon a platform while the removal of the weight by the person or animal stepping off the platform instantly shuts off the flushing process or supply thereby preventing all waste of water as well as obviating the necessity for turning water on or off.

We accomplish our object by the mechanism shown in the accompanying drawings, in which,—

Figure 4:
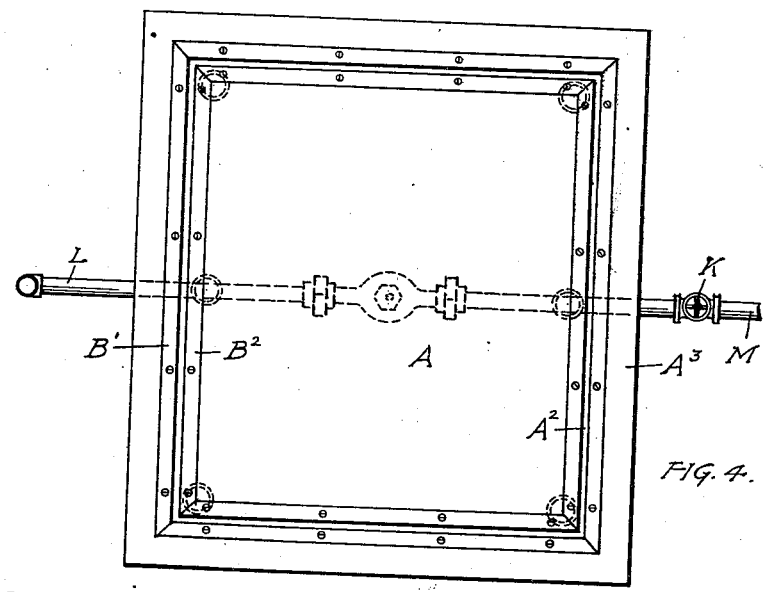
Figure 3:
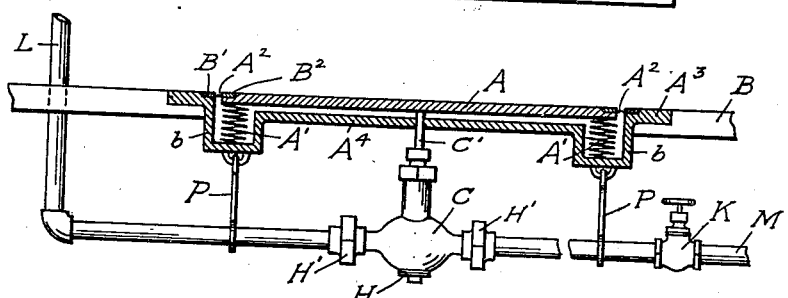
Figure 5:
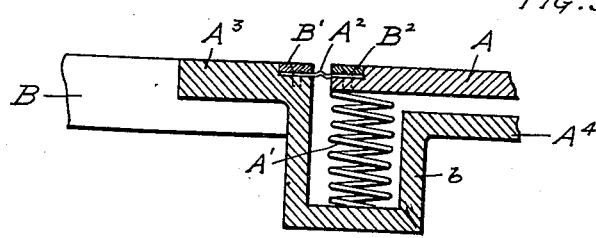

Figure 1 is a sectional elevation of a platform, broken away, and an elevational view of a foot action valve and a regulating valve, the foot action valve shown in normal position; Fig. 2 is an enlarged sectional view of a portion of the valve stem and washers; Fig. 3 is a cross sectional elevation of a platform and the foot action valve as connected together; Fig. 4 is a top view of Fig. 3, and Fig. 5 is an enlarged sectional detail of a portion of the platform and frame and the gaskets and one of the supporting springs for the platform seated in a socket.

Similar letters refer to corresponding parts throughout the several views.

In the accompanying drawings A is the platform and B is a floor which platform and floor are on a corresponding level when the platform is in normal position. The platform is supported on a plurality of springs A' A'—seated in sockets $b$ $b$—and provided with gaskets $A^2$ $A^2$—, as shown in Figs. 3 and 5. $A^3$ is the platform frame which is provided with a rest $A^4$, as shown in Fig. 3. B' and $B^2$ are metal flanges to hold rubber washers, as shown in Figs. 3, 4 and 5. Said frame and platform are preferably constructed of iron, brass or copper. The frame can be set in wood, cement, tile or any kind of floor having a smooth surface and the platform can be perforated to serve as a drain.

C is a self closing valve the body of which is cast of brass or other suitable metal; it is provided with a heavy straight valve stem C' with a solid ring D cast thereon. Said stem C' does not connect with platform A: the platform merely rests upon it. The valve body is provided with a seat D', and said stem is provided with a leather gasket $d$, a brass washer $d'$ and a screw $d^2$. E is an upright chamber on said valve. A spiral spring E', of brass or other suitable material, rests on a brass washer $E^2$ and bears against the ring D; under said brass washer there is a leather washer $E^4$ said washer $E^4$ being adapted to prevent water seeping into the chamber when the spring operates. At the top of said spiral spring above ring D there is a loose brass washer F. F' is a supplementary leather washer; said washers F and F' rest on an annular shoulder in the upper part of upright chamber E, as shown in Fig. 1. $F^2$ is a cap which closes the top of said upright chamber and bears down on washers F' and F.

$F^3$ is a stuffing box and $F^4$ is candle wicking.

H is a plug screwed into the bottom of the valve in an opening of larger circumference than seat D' to permit the replacement of gasket or washer $d$ when worn.

H' H' are union connections which are a part of the valve; by disconnecting the same, valve C can be taken out and repacked in all its parts.

I is the inlet of valve C and J is the outlet of said valve.

K is a regulating valve which can be installed at any convenient place either directly under platform A or at a distance therefrom. The object of valve K is to regulate the running stream only.

L is a pipe which can be connected to any fixture or other pipe.

M is a pipe to connect with a water supply.

N is an opening between inlet I and outlet J.

P P are hangers attached to the bottoms of spring sockets b b or to any other convenient and firm support.

The running pressure is always regulated by the man by whom they are installed and can be made greater or less as found desirable.

From the foregoing description it will be readily understood that when a person steps on platform A the weight of the person presses the platform slightly down; the platform in turn presses stem C' down which carries brass washer d' and gasket d away from seat D' allowing the water to pass from inlet I into outlet J to pipe L continuing the flushing or water supply process until the person steps off the platform when springs A' A' instantly lift the platform to its normal position spring E' simultaneously raising stem C', gasket d and its connected parts thus closing opening N and instantly stopping the flushing or water supply process. By way of illustration: There is a trough in a street (not shown) to water horses. By our invention we make it possible for the horse to turn on water for himself to drink by stepping his two fore feet on our platform; when he steps off the water ceases to flow. Where flushing fixtures are used as in urinals in a public or other building a man cannot use the same when our apparatus is attached without having running water at the same time. A person may walk up to a drinking fountain, step on our platform, and without knowing it, by his weight, turn water on; he steps off the platform and the water is shut off. This can also be done by an animal at a watering trough.

What we claim and desire to secure by Letters Patent, is,—

1. In a foot action flusher and water supply device the combination of a platform and a plurality of springs thereunder, a rest therefor, unions and the necessary receiving and discharge pipes, a regulating valve suitably placed in the receiving pipe, a self closing valve connected to said pipes and comprising an inlet and an outlet, a lower chamber communicating with said inlet and a higher chamber communicating with said outlet and an opening between said chambers, a plug in the bottom of said lower chamber, an upright chamber, a spiral spring therein, a cap for closing the upper end of said chamber, a stem extending normally from said opening through said cap and up to and abutting against said platform, a solid ring on said stem at the top of said spiral spring, washers on said stem between said cap and upright chamber, washers slidable on said stem at the bottom of said spring, a gasket, washer and screw at the bottom of said stem normally closing said opening, said gasket, washer and screw being moved below said opening when said stem is pressed down by weight on said platform thereby flushing or supplying water, said stem being elevated by said spiral spring when pressure on said platform is removed the platform being simultaneously raised by the plurality of springs thereunder.

2. In a foot action flusher or water supply device, a platform, a frame comprising a rest and a plurality of sockets under the platform, a corresponding plurality of platform actuating springs seated in said sockets, a valve spaced below said platform comprising inlet and outlet chambers and an opening the axis of which is vertically disposed in the division wall between said inlet and outlet chambers, a stem the top of which is adapted to engage with said platform and the bottom thereof having a gasket adapted to engage with the wall surrounding said opening, an upright chamber, a spiral spring operating therein normally adapted to lift said gasket into engagement with the wall surrounding the opening and retain it in such engagement when downward pressure on said platform is removed thereby automatically stopping the flushing or water supply process.

3. In a foot action flusher and water supply device, a valve body having union connections and comprising an inlet chamber, a plug in the bottom thereof, and an outlet chamber extending part way over the inlet chamber, the division wall between said chambers having an opening, an upright chamber on the top of said valve body, a cap for the upright chambers and a stuffing box, a stem, a solid ring cast on said stem near the top of said upright chamber, a loose brass and a supplementary leather washer above said ring, a gasket and washer secured to the bottom of said stem and adapted to normally close said opening, a spiral spring in said upright chamber one of its ends engaging with said solid ring to force said gasket and washer up to their normal positions and stop the flushing or water supply process after said gasket and washer have been forced down into the inlet chamber to permit such process.

4. A device of the kind described comprising a platform and a rest thereunder, a plurality of sockets in the rest, a valve casing spaced below said platform and rest, an upright chamber on the top of said valve casing, a cap and stuffing box on the top of said upright chamber, a spiral spring in said upright chamber, said valve casing having a horizontal division wall providing inlet and outlet chambers, and having an opening between said chambers, a stem provided with a gasket, washer and screw at the bottom and a solid ring midway thereon, said stem extending vertically from said inlet chamber, through said outlet and upright chambers, cap and stuffing box and rest-member into contact with said platform, said ring positioned within the chamber and one end of the spiral spring bearing against the ring and tending to move said stem outwardly, said stem being adapted to open the device for flushing or a water supply when said platform is pressed down and shutting off such flushing or water supply when the platform pressure is withdrawn.

5. A self closing valve consisting of a body of suitable material, horizontally disposed inlet and outlet chambers therein arranged one above the other, the division wall between said chambers having an opening therein the axis of which is vertically disposed in said wall, a plug in the bottom of the lower chamber, union connections at the inlet and outlet openings of the inlet and outlet chambers respectively, an upright chamber on said valve body provided with an annular recess within the upper part thereof, a metal cap screwed on said upright chamber, a stuffing box screwed on said cap, a valve stem extending through said upright chamber having its lower end threaded, a metal ring midway on and rigid with said valve stem and located in the upright chamber, metal washers and a gasket between the same on the lower end of said stem and a screw to retain said washers and gasket in place, the gasket adapted to seal and unseal said opening, a metal washer and a leather washer thereunder in the bottom of said upright chamber, a spiral spring seated thereon its upper end engaging with the bottom of said ring, a metal washer resting in said annular recess and a supplementary washer between said metal washer and the cap to prevent water that may have oozed up into the upright chamber seeping through said cap.

In testimony whereof we affix our signatures in presence of two witnesses.

BENEDICT G. WENKER.
JOHN F. KRAUSE.

Witnesses:
W. H. Sherwood,
A. S. Gillespie.